United States Patent
Skillman et al.

(10) Patent No.: US 8,259,445 B2
(45) Date of Patent: Sep. 4, 2012

(54) ENCLOSURE MECHANISM FOR A COMPUTING DEVICE

(75) Inventors: Peter Skillman, San Carlos, CA (US); Anthony Del Balso, San Jose, CA (US); Siva Raja Sekhar Reddy Yeruva, Fremont, CA (US); Michael Much, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 12/821,024

(22) Filed: Jun. 22, 2010

(65) Prior Publication Data

US 2011/0058332 A1    Mar. 10, 2011

Related U.S. Application Data

(60) Provisional application No. 61/240,279, filed on Sep. 7, 2009.

(51) Int. Cl.
*G06F 1/16* (2006.01)
(52) U.S. Cl. ......... 361/679.58; 361/679.01; 361/679.02; 16/225; 16/319; 16/320; 16/321
(58) Field of Classification Search ............. 361/679.58
See application file for complete search history.

(56) References Cited

U.S. PATENT DOCUMENTS

| | | | | |
|---|---|---|---|---|
| 3,468,576 A | * | 9/1969 | Beyer et al. | 292/251.5 |
| 4,023,388 A | * | 5/1977 | Morvai | 70/455 |
| 4,060,100 A | * | 11/1977 | Miller et al. | 138/89 |
| 4,110,552 A | * | 8/1978 | Lombardi | 174/367 |
| 5,109,686 A | * | 5/1992 | Toussant | 70/454 |
| 5,515,581 A | * | 5/1996 | Kaufmann | 24/303 |
| 6,267,608 B1 | * | 7/2001 | Yagi | 439/142 |
| 6,880,270 B2 | * | 4/2005 | Prather | 36/50.1 |
| 7,048,556 B2 | * | 5/2006 | Stanton et al. | 439/135 |
| 7,083,439 B1 | * | 8/2006 | Hayakawa et al. | 439/136 |
| 7,104,816 B1 | * | 9/2006 | Wang | 439/136 |
| 7,300,306 B2 | * | 11/2007 | Le et al. | 439/502 |
| 7,729,493 B2 | * | 6/2010 | Krieger et al. | 379/433.13 |
| 7,742,294 B2 | * | 6/2010 | Gadau et al. | 361/679.43 |
| 7,780,126 B2 | * | 8/2010 | Law et al. | 248/168 |
| 7,817,003 B2 | * | 10/2010 | Fullerton et al. | 335/306 |
| 7,855,346 B2 | * | 12/2010 | Okada | 200/333 |
| 7,887,344 B2 | * | 2/2011 | Ihara et al. | 439/136 |
| 7,950,935 B2 | * | 5/2011 | Lin et al. | 439/142 |
| 2004/0183313 A1 | * | 9/2004 | Sherman et al. | 292/251.5 |
| 2005/0124191 A1 | * | 6/2005 | Stanton et al. | 439/135 |
| 2008/0116697 A1 | * | 5/2008 | D'Ambrosio | 292/251.5 |
| 2008/0245452 A1 | * | 10/2008 | Law et al. | 150/154 |
| 2009/0130875 A1 | * | 5/2009 | Guo | 439/141 |
| 2009/0188594 A1 | * | 7/2009 | Cameron | 150/160 |
| 2009/0262489 A1 | * | 10/2009 | Lin et al. | 361/679.01 |

* cited by examiner

Primary Examiner — Anthony Q Edwards

(57) ABSTRACT

A computing device that includes a housing, an accessory interface, and a self-closing enclosure mechanism for the accessory interface. The self-closing enclosure mechanism is positioned over the accessory interface and is pivotable to move between a closed and open position.

26 Claims, 2 Drawing Sheets

ENCLOSURE MECHANISM FOR A COMPUTING DEVICE

RELATED APPLICATIONS

This application claims benefit of priority to Provisional U.S. Patent Application No. 61/240,279, filed Sep. 7, 2009; the aforementioned application being hereby incorporated by reference in its entirety.

TECHNICAL FIELD

The disclosed embodiments relate generally to computing device housings, and more particularly, to an enclosure mechanism for a computing device.

BACKGROUND

Electronic devices can increase functionality by connecting to other devices. Connector ports and interfaces are often used to augment or extend the functionality of a computing device. On mobile computing devices, for example, such ports enable the mobile computing device to receive connectors, memory cards or other devices.

DETAILED DESCRIPTION

Figure 1:
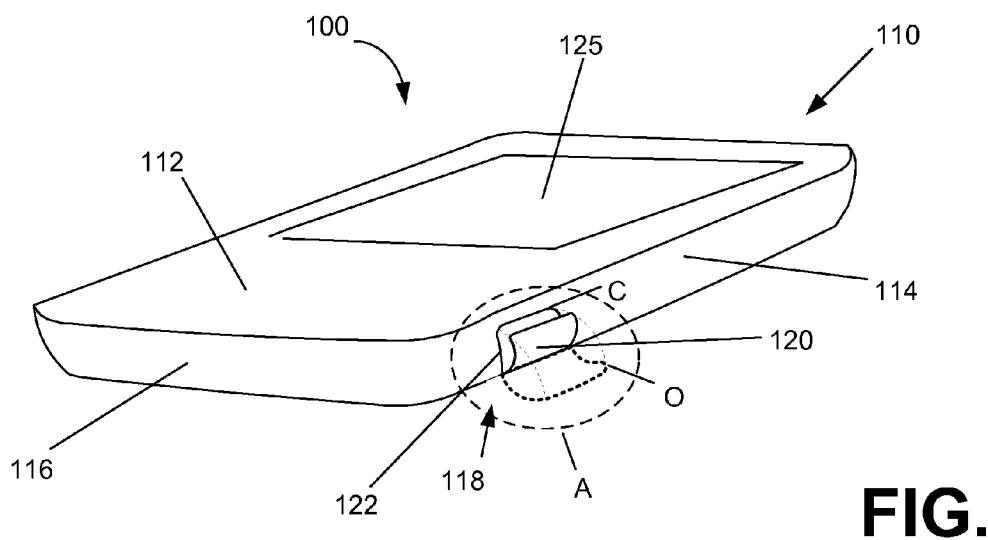
FIG. 1 is an isometric side view a computing device that includes a self-closing enclosure mechanism, according to an embodiment.

Embodiments described herein provide an enclosure mechanism, such as a door, for use in protecting a connector interface or sensitive component of a computing device. In some embodiments, the enclosure mechanism provides a door that can be opened to enable access to the interface/component, and then closed to protect the interface/component.

Accordingly some embodiments described herein provide for a self-closing enclosure mechanism for a computing device. An example of an enclosure mechanism includes a door, façade structure or other surface that can substantially pivot about an end. An enclosure mechanism such as described may be positioned to enclose an accessory interface until a user of the computing device requires access to the accessory interface. The user can then pivot the enclosure mechanism into an open position, and access the accessory interface. Embodiments provide that when the enclosure mechanism is released, the enclosure mechanism self-propels into a closed and shut position against the housing.

In some embodiments, a door (as an example of an enclosure mechanism) for protecting a connector interface or component of a computing device is provided that is magnetically latched. The door may be hinged so that it can pivot between open and closed positions. The magnetic latch enables the door to self-close when it is brought sufficiently close to the interface or component. In an embodiment, the magnetic latch also enables the door to self-shut, so as to be substantially flush or flat against the computing device surface on which it is provided. As an addition or alternative, the door can be connected to the computing device so that the door can bias on a hinge or pivot connection when opened. The bias facilitates in the door being able to self-propel towards a closed position. In some embodiments, the door is capable of self-pivoting from the open position to the closed position, and even to be shut closed against the computing device, upon a user removing contact when the door is in the open position. In other variations, the user can effectuate the door being pivoted into the closed position with light gestures, that but for the bias and/or magnetic latch, would not be sufficient to close or shut the door.

Accordingly, embodiments such as described provide for an enclosure mechanism that is, by default, in position to protect an accessory interface. The user can operate the enclosure mechanism to access the accessory interface without concern of losing or separating the enclosure mechanism from a remainder of the housing of the computing device. Additionally, according to some embodiments, the combination of the magnetic latch and biasing force may enable the user to close the enclosure mechanism with a simple finger sweep.

According to an embodiment, a computing device includes a housing, an accessory interface, and a self-closing enclosure mechanism. The self-closing enclosure mechanism is positioned over the accessory interface and is pivotable to move between a closed position and an open position. In the open position, an accessory interface is exposed. In the closed position, some embodiments provide for the enclosure mechanism to shut against the housing.

Still further, some embodiments provide for a computing device housing that includes an opening and an enclosure mechanism. The opening is positioned to align with an accessory interface of the computing device. The enclosure mechanism is pivotable over the opening to move between an open and a closed position. In one implementation, the enclosure mechanism is formed from an elastomer, and stems from the housing so as to bias and be capable of self-propelling towards the closed position from the open position. In another implementation, the enclosure mechanism is formed from hardened plastic.

As used herein, the term "self-closing" means a structure that is capable of self-propelling from either a fully open or partially open position to a rested position in which the enclosure mechanism is substantially closed, so as to enclose a corresponding opening or underlying structure. In some embodiments, the self-propelling structure of the enclosure mechanism is provided by forces that include (i) a bias of the structure when it is in the open position, and/or (ii) magnetic attraction from a magnetic latch. The self-propelling nature of the enclosure mechanism enables it to respond to light gestures of the user that, but for its self-propelling nature (brought by bias or magnetic attraction), would otherwise not be sufficient to move the enclosure mechanism to a closed position. According to some embodiments, an enclosure mechanism may use bias, formed from, for example, an elastomeric connection with the housing in order to propel itself from the open position to the closed position. Still further, some embodiments provide for use of magnets to enable the enclosure mechanism to be pivoted into a closed or shut position against a surface of the housing.

FIG. 1 is an isometric side view a computing device that includes a self-closing enclosure mechanism, according to an embodiment. In an embodiment shown, the device is a mobile computing device 100. The housing 110 includes front façade 112 and sidewalls 114, 116. The front façade 112 may include a display surface 125 (e.g. touch-screen or LCD), as well as a keyboard or keypad, and other interface mechanisms (e.g. buttons). The mobile computing device 100 may correspond to, for example, a mobile telephony/data messaging computing device, such as a cellular phone or mobile device with voice-telephony capabilities (sometimes called "smart phone"). A computing device such as described may be small enough to fit in one hand, while providing cellular telephony features in combination with other applications, such as messaging, web browsing, media playback, personal information management (e.g. contact records management, calendar applications, tasks lists), image or video/media capture and other functionality. Other types of devices that are encompassed by embodiments described herein include devices that are primarily used as media players, for Global Positioning Services (GPS) services, video recording, image capture, and computers, such as laptops, tablet devices, notebook computers, and ultra-mobile computers.

According to one or more embodiments, the housing 110 encapsulates components that include, for example, a printed circuit board, processor, memory, display components, and audio components. The housing 110 may also house or otherwise provide one or more accessory interfaces, such as connector ports (e.g. female micro- or mini-USB connectors) or memory card slots. The accessory interfaces may be used to extend connectors, cables and other devices to the computing device.

According to embodiments, the housing segment 110 includes an entry structure 118 for providing access to an accessory interface (e.g. connector port). The entry structure 118 includes an enclosure mechanism 120 that is (i) pivotable away from the housing to expose an opening 122 ("open position" shown by O) that can provide access to a connector port (e.g. female micro-USB connector) or other accessory interface; (ii) self-closing, in that it is structured to pivot from the open position to a closed position (shown by C), with application of light (i.e. insufficient to otherwise move the enclosure mechanism to the closed position) or no force from the user. Rather, the enclosure mechanism 120 pivots towards the closed position using a bias, formed by the material of the enclosure mechanism 120 biasing when in the open position. Additionally, in an embodiment, a magnetic latch is provided between the enclosure mechanism 120 and a surface of the accessory interface or enclosed region, to enable the enclosure mechanism to self-propel and shut flush or against a surface of the housing. The magnetic latch may engage once the bias propels the enclosure mechanism sufficiently close to being shut against the housing 110. Once in the closed position, the magnetic latch may further bias the enclosure mechanism to remain in the closed position, so as to facilitate the enclosure mechanism from opening as a result of inadvertent forces (such as the user carrying the device in a pocket).

Figure 2:
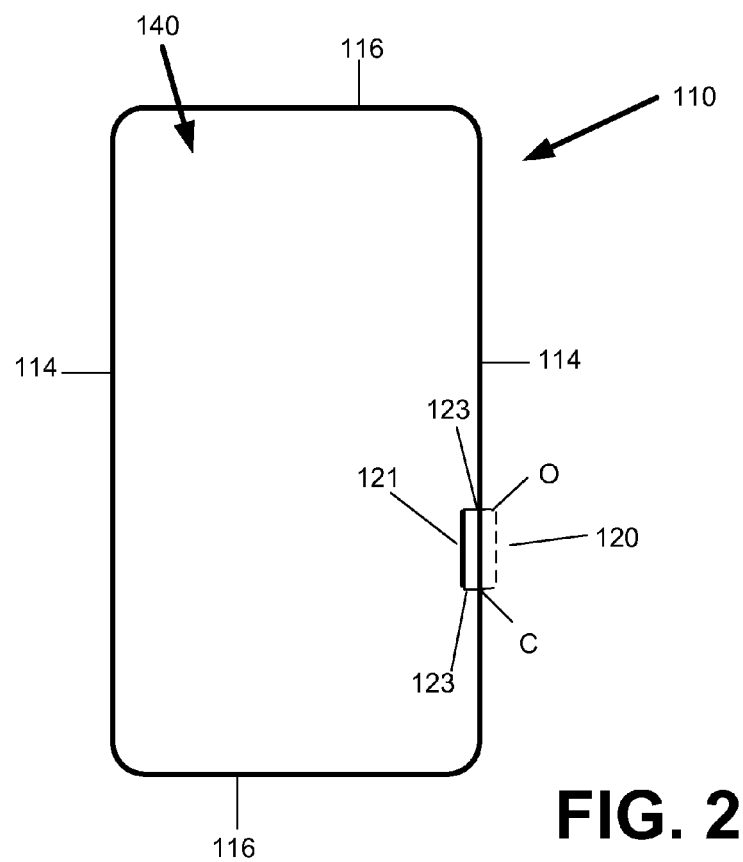
FIG. 2 is a back view of a housing configured to include an enclosure mechanism, according to an embodiment.

FIG. 2 is a back view of the housing 110, under an embodiment. A rear façade 140 is shaped to extend to sidewalls 114, 116. In an embodiment, the enclosure mechanism 120 is an integrated or unitarily formed appendage of the portion of housing 110 forming the rear façade 140. In one implementation, the enclosure mechanism 120 is unitarily formed to stem off of rear façade 140 (or other portion of the housing). In particular, the enclosure mechanism 120 stems from a hinge line 121, and contours with sidewall 114 to match the contour and form part of sidewall 114 when in the closed position C. In order to enable movement of the enclosure structure 120 to the open position O, the enclosure mechanism is physically connected to the rear façade 140 at only the hinge line 121. The other two sides 123 of the enclosure mechanism 120 may be cut so as to be separated from the rear façade 140, thus enabling freedom of the enclosure mechanism to pivot.

In an embodiment, the integration of the enclosure mechanism 120 with the housing 110 enables the biasing force to propel the enclosure mechanism 120 from the open position O towards the closed position C. The housing 110 (or at least a portion thereof) and the enclosure mechanism 120 are formed from elastomer material, so that the bias is created when the enclosure mechanism 120 is moved away from the closed position C. In one embodiment, the elastomer material is thermoplastic polyurethane (TPU). In some variations, the hinge line 121 may be fortified with thickness, or additional rigidity to increase the bias of the enclosure mechanism 120 when it is pivoted from the closed position.

In other implementations, the enclosure mechanism 120 is formed from hardened plastic. Both the enclosure mechanism and the housing 110 (or the portion of the housing that provides the enclosure mechanism 120) may be formed from hardened plastic.

With regard to embodiments shown, the location of the hinge line 121 may be varied. For example, while an embodiment shown with FIG. 2 depicts the hinge line 121 being on the bottom façade of the housing, other implementations may position the hinge line 121 on the sidewall 114 or on a transition surface between the sidewall and the rear façade. Moreover, in other embodiments the hinge line 121 may be replaced with a structural hinge, including one that can bias similar to the manner described.

Figure 3:
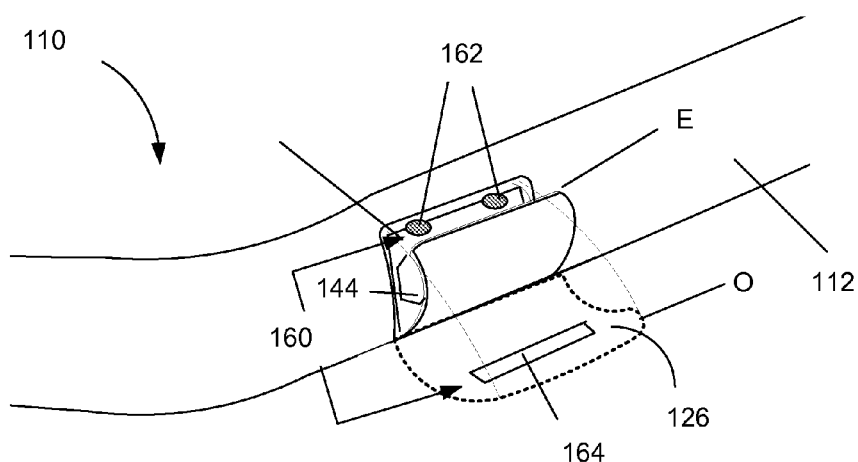
FIG. 3 is a close-up of region A of FIG. 1, under an embodiment.
Figure 4:
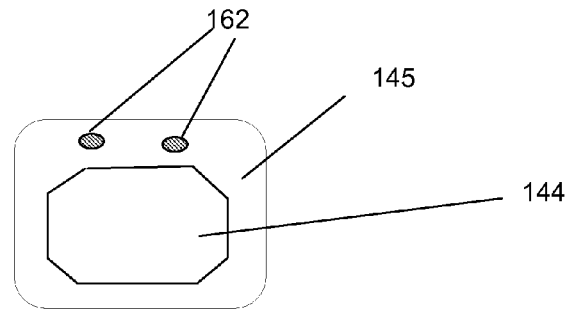
FIG. 4 illustrates an accessory interface in an exposed position, for use with one or more embodiments described herein.

FIG. 3 is a close-up of region A of FIG. 1, showing additional details of entry structure 118 and housing 110, according to an embodiment. In FIG. 3, the enclosure mechanism 120 is shown to pivot from the open position O towards the closed position C (not shown in FIG. 3). In the open position, the accessory interface 144 is exposed, and the user can, for example, couple a connector cable to a connector interface of the computing device 100. The movement of the enclosure mechanism 120 towards the closed position may be self-propelled. For example, in use, the user may pull the enclosure mechanism 120 into the open position O (thereby biasing it), access and use the accessory interface 144, then release the enclosure mechanism. The enclosure mechanism 120 uses the bias to self-propel into the closed position. However, bias alone is generally insufficient to cause the enclosure mechanism 120 to shut flush against the sidewall 114. Accordingly, some embodiments include a magnetic latch 160 that causes the enclosure mechanism 120 to shut when the enclosure mechanism 120 is brought by bias into a sufficiently proximate position (depicted by E) to the accessory interface 144 to engage the magnetic latch. The magnetic latch 160 may be formed by a combination of (i) magnetic elements 162, and (ii) magnetically attractive element(s). As shown by FIG. 4, the magnetic elements 162 are positioned at or near the accessory interface 144. The magnetic elements 162 may be flush against the surface of the interface. The magnetically attractive elements may be provided by, for example, a metal or metallic bar 164 positioned on an interior surface 126 of the enclosure mechanism 120. The metal bar 164 may be formed from steel, and recessed into the interior surface 126 to be securely held.

Furthermore, while an embodiment shown with FIG. 1 through FIG. 3 provide for the sidewall 114 and the enclosure mechanism 120 to be contoured, other variations provide that the sidewall and enclosure mechanism are relatively flat (or more flat), so as, for example, to be more straight and less bulbous. The exact contour of the sidewall 114 and the enclosure mechanism 120 may be varied.

FIG. 4 illustrates accessory interface 144 when exposed (i.e. when the enclosure mechanism 120 is in the open position). As mentioned, the accessory interface 144 may correspond to, for example, a connector interface (e.g. female connector), although other interfaces may be used, such as receiving slots (e.g. to hold memory cards), plug connectors or jacks. In an implementation shown, magnetic elements 162 are positioned near the accessory interface 144. As alternatives, the magnetic elements 162 may be integrated into a surface 145 of the interface 144, provided by alternative formations, or integrated into a surrounding structure of the accessory interface (e.g. a top edge). Still further, the enclosure mechanism 120 may include magnetic elements 162, and the accessory interface 144 (or its surrounding area) may include metal. As another variation, both the accessory interface and the enclosure mechanism 120 can carry magnets.

Figure 5:
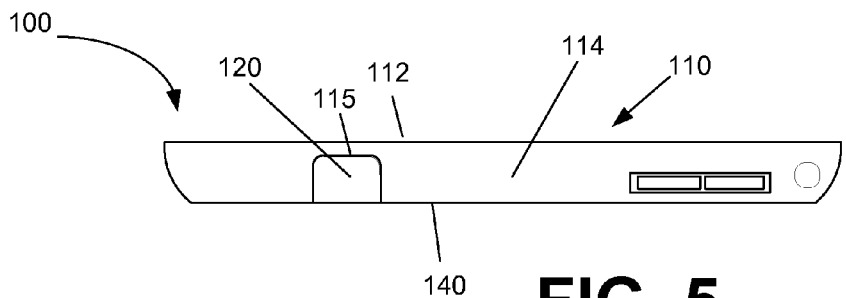
FIG. 5 is a side view of a computing device having an enclosure mechanism that is shut against its housing in the closed position, according to an embodiment.

FIG. 5 illustrates the enclosure mechanism shut against the housing of the computing device. When shut, the enclosure mechanism 120 may be substantially flush against the sidewall 114. Separation lines 115 indicate where the enclosure mechanism can be pulled down into the open position. In an implementation shown, the enclosure mechanism 120 is pulled down towards the rear façade 140 (from the front façade 112).

ALTERNATIVES AND VARIATIONS

While embodiments described herein provide for an enclosure mechanism that is structured for mobile computing devices, embodiments recognize that an enclosure mechanism such as described may be provided for any form of computing device. For example, an enclosure mechanism in accordance with embodiments described herein may be incorporated into a housing for a netbook or laptop.

As an alternative to hinge line 121 (see FIG. 2), a spring-loaded hinge may be used to enable the enclosure mechanism to move between the open and closed position with bias.

Although illustrative embodiments have been described in detail herein with reference to the accompanying drawings, variations to specific embodiments and details are encompassed herein. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
a housing;
an accessory interface;
an enclosure mechanism provided with the housing and pivotable between an open and a closed position, the enclosure mechanism being positioned over the accessory surface to (i) provide access to the accessory interface when in the open position, and (ii) enclose the accessory interface when in the closed position, wherein the enclosure mechanism is extended from a hinge line that is unitarily formed into a portion of the housing; and
a magnetic latch provided with the accessory interface and the enclosure mechanism to facilitate the enclosure mechanism being moved into and remaining in the closed position.

2. The computing device of claim 1, wherein the magnetic latch comprises a magnetic element positioned on at least one of (i) a surface of the accessory interface; or (ii) an interior surface of the enclosure mechanism.

3. The computing device of claim 2, wherein the magnetic element is positioned on the surface of the accessory interface, and wherein magnetic latch comprises a metallic element positioned on the interior surface of the enclosure mechanism.

4. The computing device of claim 1, wherein the accessory interface includes a connector port for the computing device.

5. The computing device of claim 1, wherein the housing and the enclosure mechanism are formed from an elastomer, and wherein the enclosure mechanism stems from the housing, so that when the enclosure mechanism is moved into the open position, the enclosure mechanism is biased into moving back towards the closed position.

6. The computing device of claim 5, wherein the elastomer of the enclosure mechanism, in combination with the magnetic latch, enables the enclosure mechanism to move from the open position into the closed position with only light or no additional applied force from the user, so that the enclosure mechanism is substantially flush with a surface of the housing.

7. The computing device of claim 1, wherein the computing device is a cellular device.

8. The computing device of claim 1, wherein the enclosure mechanism is contoured to match a corresponding contour of a surface of the housing that receives the enclosure mechanism in the closed position.

9. The computing device of claim 1, wherein the enclosure mechanism is formed from hardened plastic.

10. A housing for a computing device comprising:
an opening that is positioned to align with an accessory interface of the computing device;
an enclosure mechanism, positioned to be pivotable over the opening to move between an open and a closed position;
wherein the housing is formed from an elastomer, and the enclosure mechanism stems from the opening so as to bias and be capable of self-propelling towards the closed position from the open position.

11. The housing of claim 10, further comprising a magnetically attractive element provided on an interior surface of the enclosure mechanism that is positioned to align and form a magnetic latch with another element when the enclosure mechanism in the closed position.

12. A computing device comprising:
a housing;
an accessory interface; and
a self-closing enclosure mechanism that is positioned over the accessory interface and pivotable from a closed position to an open position to expose the accessory device, wherein the self-closing enclosure mechanism is formed from elastomer material and is unitarily formed on one end to extend from a portion of the housing, so as to form a hinge line that enables the enclosure mechanism to bias when in the open position.

13. The computing device of claim 12, further comprising a magnetic latch that is at least partially integrated with the enclosure mechanism to enable the enclosure mechanism to shut against the housing.

14. The computing device of claim 13, wherein the magnetic latch includes a metallic element that is provided on an interior surface of the enclosure mechanism.

15. The computing device of claim 14, wherein the self-closing enclosure mechanism is capable of self-propelling from the open position to the closed position in response to the user releasing the enclosure mechanism at the open position.

16. The computing device of claim 12, wherein the self-closing enclosure mechanism is capable of self-propelling from the open position to the closed position in response to a light tap or movement from a user, that would, but for the bias, be insufficient to move the enclosure mechanism to the closed position.

17. The computing device of claim 12, wherein the enclosure mechanism is contoured to match a corresponding contour of a surface of the housing that receives the enclosure mechanism in the closed position.

18. The computing device of claim 12, wherein the self-closing enclosure mechanism is formed from hardened plastic and is unitarily formed on one end to extend from a portion of the housing.

19. A computing device comprising:
a housing;
a component that is accessible on the housing for use;
a door that is provided as a feature of the housing to protect the component, the door being pivotable between (i) an open position that provides access to the component, and (ii) a closed position that protects the component, wherein the door is extended from a hinge line that is unitarily formed into a portion of the housing; and
a magnetic latch, formed by a combination of elements that are distributed on (i) an interior surface of the door, and (ii) a surface of the housing or component, to magnetically retain the door in the closed position.

20. The computing device of claim 19, wherein the magnetic latch includes (ii) one or more magnets provided on a surface of the component, and (ii) magnetically attractive material provided on an interior surface of the door.

21. The computing device of claim 19, wherein the magnetic latch is configured to self-propel the door into the closed position from the open, or a partially opened position.

22. The computing device of claim 19, wherein the door is formed from an elastomer.

23. The computing device of claim 19, wherein the door is formed from hardened plastic.

24. The computing device of claim 19, wherein the door is connected to the housing to bias when moved towards the open position.

25. The computing device of claim 24, wherein the door and the housing are formed from a same material.

26. The computing device of claim 19, wherein the component corresponds to a connector interface.

* * * * *